(12) United States Patent
Adendorff et al.

(10) Patent No.: US 8,992,210 B2
(45) Date of Patent: Mar. 31, 2015

(54) METHOD AND DEVICE FOR DILUTED COMBUSTION

(75) Inventors: Martin Adendorff, Munich (DE); Stefan Rudig, Köln (DE)

(73) Assignee: Linde Aktiengesellschaft, Munich (DE)

( * ) Notice: Subject to any disclaimer, the term of this patent is extended or adjusted under 35 U.S.C. 154(b) by 508 days.

(21) Appl. No.: 13/305,886

(22) Filed: Nov. 29, 2011

(65) Prior Publication Data
US 2012/0301835 A1    Nov. 29, 2012

(30) Foreign Application Priority Data
Dec. 1, 2010   (DE) .................... 10 2010 053 068

(51) Int. Cl.
| | |
|---|---|
| *F23D 14/22* | (2006.01) |
| *F23C 7/02* | (2006.01) |
| *F23C 99/00* | (2006.01) |
| *F23L 7/00* | (2006.01) |

(52) U.S. Cl.
CPC . *F23C 7/02* (2013.01); *F23C 99/00* (2013.01); *F23C 2900/99001* (2013.01); *F23L 7/007* (2013.01); *F23L 2900/07006* (2013.01); *F23L 2900/07007* (2013.01); *Y02E 20/322* (2013.01); *Y02E 20/342* (2013.01); *Y02E 20/344* (2013.01)
USPC .......................................................... 431/12

(58) Field of Classification Search
CPC ............. F23D 14/22; F23L 7/007; F23L 2900/07005; F23N 2037/28; C03B 2211/30
USPC .................. 431/162, 181, 278, 281
See application file for complete search history.

(56) References Cited

U.S. PATENT DOCUMENTS

| | | | |
|---|---|---|---|
| 4,541,796 A * | 9/1985 | Anderson ..................... | 431/187 |
| 4,622,007 A * | 11/1986 | Gitman ......................... | 432/13 |
| 4,907,961 A | 3/1990 | Anderson | |
| 4,931,013 A * | 6/1990 | Brahmbhatt et al. .......... | 431/10 |
| 5,104,310 A | 4/1992 | Saltin | |
| 5,503,548 A | 4/1996 | Franke et al. | |
| 5,570,679 A | 11/1996 | Wunning | |
| 6,283,747 B1 | 9/2001 | Legiret et al. | |
| 6,524,097 B2 * | 2/2003 | Hoke et al. ................... | 431/8 |
| 7,029,271 B2 | 4/2006 | Wunning et al. | |
| 8,231,380 B2 * | 7/2012 | Tsiava et al. .................. | 431/12 |
| 8,454,351 B2 * | 6/2013 | Tsiava et al. .................. | 431/10 |
| 8,469,699 B2 * | 6/2013 | Leroux et al. ................ | 431/8 |
| 8,714,969 B2 * | 5/2014 | Leroux et al. ................ | 431/10 |
| 2001/0023053 A1 * | 9/2001 | Hoke et al. ................... | 431/8 |
| 2003/0054301 A1 | 3/2003 | Borders et al. | |
| 2009/0061366 A1 * | 3/2009 | Rosen et al. .................. | 431/12 |
| 2009/0280444 A1 * | 11/2009 | Watson et al. ................ | 431/10 |
| 2010/0183990 A1 * | 7/2010 | Watson et al. ................ | 431/8 |

FOREIGN PATENT DOCUMENTS

| | | |
|---|---|---|
| DE | 1 053 443 B | 3/1959 |
| EP | 0 757 205 A2 | 2/1997 |

(Continued)

OTHER PUBLICATIONS

European Search Report for EP 11 00 2007, Date: Jun. 20, 2011, Authorized Officer: Den Haag, 7 pp.

*Primary Examiner* — Jorge Pereiro
(74) *Attorney, Agent, or Firm* — Joshua L. Cohen (57) ABSTRACT

A burner for diluted combustion includes a fuel nozzle for supplying fuel to a combustion chamber, at least one air nozzle for supplying air to the combustion chamber, and at least one oxygen nozzle for supplying oxygen to the combustion chamber. The air nozzle and oxygen nozzle are spatially separated from each other.

17 Claims, 8 Drawing Sheets

(56) References Cited

FOREIGN PATENT DOCUMENTS

| | | |
|---|---|---|
| EP | 2 166 284 A2 | 3/2010 |
| GB | 1143117 | 2/1969 |
| JP | 2005016854 A * | 1/2005 .............. F23C 11/00 |
| WO | WO 2008/007016 A2 | 1/2008 |

* cited by examiner

METHOD AND DEVICE FOR DILUTED COMBUSTION

BACKGROUND OF THE INVENTION

The present invention relates to a method and a device for diluted combustion.

Known from prior art are burners with flameless combustion. As described in the information sheet "projektinfo 07/06" of the BINE information service, which is available for download online at http://www.bmwl.de/BMWi/Redaktion/PDF/B/bine-themeninfo-flammenlose-verbrennung,property=pdf, bereich=bmwi,sprache=de,rwb=true.pdf, fuel gas and combustion air stream into a combustion chamber at a high flow rate in such burners. The major difference from conventional flame burners is the strong internal recirculation of exhaust gases in the combustion chamber, and their becoming mixed with the combustion air. The resultant diminished oxygen content in the combustion air and delayed mixture of air and fuel gas prevents the formation of a flame front. At high enough temperatures of at least 450° C. to 500° C., the fuel oxidizes in the entire combustion chamber volume. Very homogeneous temperatures set in as a result. The formation of thermal nitrogen oxides ($NO_x$) that takes place predominantly at a flame limit is avoided. The more uniform temperature distribution not only causes the nitrogen oxide emissions to drop, but also allows a higher average combustion chamber temperature to be maintained.

In conventional burners, the combustion processes are most frequently monitored using UV measuring instruments. This is not always possible during flameless operation. As a rule, the useful space temperature is measured instead of measuring the UV signal. If a temperature limit is exceeded, ignition and complete burnout are ensured.

DE 44 00 831 A1 describes a burner with reduced corrosive gases. This burner encompasses a central feed channel for a primary oxygen stream, which is arranged on the center axis of a water-cooled feed channel for a fuel stream, and hence concentrically enveloped by the feed channel. The temperature of the primary oxygen stream is ≤30° C., and the percentage of primary oxygen stream in the stoichiometrically required oxygen quantity is <1%. Also provided is to recirculate combustion exhaust gases so as to ensure flameless combustion. For example, eight primary oxygen nozzles are provided, circularly enveloping the feed channel. Recirculating the combustion exhaust gases is intended to prevent temperature spikes in the flame root, and hence pollutant emissions. As a result, the flame is kept stable at the outlet, and burns at a low flame temperature. The cooling and associated low temperature of ≤30° C. of the primary oxygen stream yields a stable ignition flame with small quantities of primary oxygen, which produces a sufficient UV signal for monitoring the burner.

Known from U.S. Pat. No. 4,907,961 is an oxygen burner. This burner uses oxygen or oxygen-enriched air. In this burner, a first oxidant containing at least 30% v/v (volume per volume) oxygen is fed to a burner. This oxidant is supplied at a high speed. In addition, a second oxidant is to be supplied, the portion of which measures at least 1% of the total oxygen quantity fed to the combustion chamber. This second oxidant also contains at least 30% v/v oxygen, and is supplied at a low speed. For example, oxygen-enriched air can be generated by mixing pure oxygen and air. A stable flame is to be obtained at an interface between the gases.

U.S. Pat. No. 5,104,310 describes a burner that operates at a reduced flame temperature. This burner encompasses a central oxygen nozzle, and at least one nozzle for supplying the fuel, which concentrically envelops the oxygen nozzle. Provided radially spaced apart from the oxygen nozzle is at least one additional nozzle, which is designed as a de Laval nozzle. In this burner, the oxygen is supposed to be supplied at a very high rate, in particular to aspirate ambient air having a lower temperature than the flame before the oxygen from the oxygen nozzle reacts with the fuel. Several peripheral oxygen nozzles concentrically arranged around and spaced radially apart from the central oxygen nozzle can also be provided. The percentage of oxygen volume supplied through the peripheral nozzles measures between 60% and 90%, and preferably between 75% and 85% of the overall oxygen quantity fed to the burner. In this way, the majority of the oxygen-containing gas necessary for burning the fuel is supplied via the peripherally arranged oxygen nozzles. These oxygen streams aspirate additional ambient air before the oxygen reacts with the flame. The ambient air has a lower temperature than the flame. The aspiration of ambient air reduces the oxygen content and temperature in the peripheral oxygen streams. This mixture is prepared before it comes into contact with the fuel. This gas mixture consists of oxygen-enriched air, which contains at least 50% oxygen.

EP 0 685 683 A2 describes a burner with low $NO_x$ emission. In this burner, it can be provided that the combustion chamber be exposed by an air supply device to so high an air throughput that the combustion exhaust gases exiting the nozzle-like outlet of the combustion chamber become aspirated by the injector action, and are thereby again fed to the combustion air. After a temperature of 600° C. to 800° C. has been exceeded in the heating chamber, the fuel supply is to be switched over to bring this burner into a normal operating state, in which the high outlet pulse in particular of the combustion air from the combustion chamber is retained, largely suppressing the reaction of fuel and air in the area in front of the nozzle outlet into the combustion chamber and shifting it into the heating chamber. This burner can encompass a fuel nozzle enveloped by a coaxial fuel lance, wherein a combustion air feed pipe socket that empties into a combustion chamber is provided, which together with a combustion valve forms an air supply device.

Known from EP 1 355 111 A2 is a burner for flameless combustion. This burner encompasses a reaction chamber, which is fed with a fuel-gas mixture by a burner. The burner encompasses an air supply channel that extends until into an interior space enveloped by the burner head. A fuel pipe extends through the air supply channel until into the interior space. The fuel pipe is centrally arranged in the interior spaces, and hence enveloped by the air supply channel. The burner emits the fuel-air jet transversely to its longitudinal axis. An exhaust gas channel is arranged in or on the burner, concentrically or parallel to the longitudinal axis of the burner. The outlet direction of the burner and exhaust gas channel direction cross each other. In this burner, the fuel is introduced into the furnace chamber parallel or inclined relative to the furnace wall. The burner head is preferably configured in such a way that the fuel-air mixture assumes a high enough speed at the outlet opening to sweep away any flame. This permits a flameless mode of operation, in which the reaction between the fuel and air is distributed over a larger portion of the reaction chamber. In addition, the fuel-air jet aspirates a lot of hot exhaust gas, in particular in proximity to the inlet opening of the exhaust gas channel, and entrains the latter, additionally supporting flameless operation. For example, a recuperator or regenerator can be provided to preheat the fuel, air or fuel-air mixture. This burner is an air burner.

SUMMARY OF THE INVENTION

The object of the present invention is to provide a cost-effective, low-emission and process-optimized method with as flameless a combustion as possible and a corresponding burner.

The invention exhibits the features specified in the claims to achieve this object. Advantageous embodiments thereof are indicated in the claims.

Provided according to the invention is a method for diluted combustion in which a fuel stream, an air stream and an oxygen stream are supplied to a combustion chamber with a burner. The air stream and oxygen stream are supplied spatially separate from each other, and can be adjusted independently of each other. As a consequence, a switch can be made between a pure operation with air and pure operation with oxygen and a mixed operation with oxygen and air during the combustion process.

Within the framework of the present invention, diluted combustion implies a largely flameless combustion, in which local, thermal temperature spikes are avoided through the recirculation of exhaust gas. The recirculation of exhaust gas can involve an internal or external recirculation. The term 'largely' signifies that a permanently burning ancillary flame can be present. However, the temperature spikes achieved by conventional flames are not reached in the entire combustion chamber.

The spatial separation of oxygen and air in the method according to the invention prevents the formation of regions having a high oxygen concentration simultaneously accompanied by a high nitrogen concentration. Such regions form in particular in burners that use oxygen-enriched air as the oxidant. In these regions, nitrogen oxides ($NO_x$) form during combustion. Because oxygen and air react with fuel largely separate from each other, $NO_x$ emissions are significantly reduced.

Since a switch can be made between pure operation with air and pure operation with oxygen and a mixed operation with oxygen and air during the combustion process, the method can be efficiently tailored to the respective process.

In operations with pure oxygen, a smaller quantity of gas is supplied to the combustion chamber by comparison to operations that use air, so as to provide the stoichiometrically required amount of oxidant. Nearly the entire quantity of gas is here used for combustion purposes. Because less gas is supplied, the amount of exhaust gas is low. Since the oxidant contains only oxygen, more energy is introduced at the same quantity of fuel. There are almost no non-oxygen constituents in the oxidant, so that less energy is lost with the exhaust gas. As a result, energy introduction is very high during operations with pure oxygen. Gases like nitrogen are virtually absent. As a consequence, no harmful $NO_x$ gases are formed. Therefore, the exhaust gas has only a very slight percentage of contaminants in this operating state. This makes it possible to make a corresponding device for implementing the method extremely compact, while still providing a high thermal capacity.

In operations with air, a larger quantity of gas is introduced into the combustion chamber for oxidation by comparison to operations that use pure oxygen, so as to provide the stoichiometrically required amount of oxidant. The entire quantity of gas is here not used for combustion purposes, since in addition to oxygen, the oxidant also contains nitrogen and other constituents not usable for combustion. Because more gas is supplied, the amount of exhaust gas is greater to provide enough oxidant. More energy is lost with the larger quantity of exhaust gas, and less energy is introduced. The nitrogen contained in the air also leads to the formation of harmful $NO_x$ gases. Therefore, the exhaust gas has a higher percentage of contaminants in this operating state. On the other hand, the method can be implemented very cost-effectively, since air generates tangibly lower costs in comparison to oxygen.

The burner can be used to supply another oxygen stream to the combustion chamber centrally in the fuel stream. Hence, this central oxygen stream is enveloped by the fuel stream, and along with a portion of the fuel in the fuel stream forms an ancillary flame. This ancillary flame permanently generates a UV signal, which can be detected with a UV-probe.

The streams can exhibit the same direction as they exit the burner, which is roughly parallel to a longitudinal direction of the burner. In particular in operations with oxygen and air, this ensures in particular that the air and oxygen will be close to spatially separated when reacting with the fuel.

The burner can be operated exclusively with oxygen during runup. The higher amount of energy introduced significantly shortens the time it takes to reach the nominal temperature by comparison to burners operated with enriched air. In addition, considerably lower $NO_x$ emissions are encountered.

The burner can then be operated exclusively with air in nominal operation. No swirling bodies are here needed to bring the oxygen contained in the air in contact with the fuel. The swirls caused by the recirculating exhaust gas during nominal operation are sufficient for this purpose. Swirling bodies that necessitate installation space and complicate the burner design layout are not required. This makes it possible to implement the method more cost-effectively, using a more compact device.

As a result, a compact device can be operated with air. If not enough heat is introduced during operation with air, oxygen can be metered in, a mixed mode can be initiated, or the process can again be conducted completely with pure oxygen, depending on what is needed.

Therefore, the burn performance can be optimally tailored to the requirements of the combustion process and optimized at any time.

In addition, exhaust gas can be recirculated in the combustion chamber, wherein this recirculation can take place internally or externally. This further reduces the $NO_x$ emissions.

In the method, oxygen and/or air are each supplied to a combustion chamber at a high speed. A high speed for the oxygen stream denotes a speed of at least 50 m/s, and preferably of between 80 m/s and 200 m/s. A high speed for the air stream denotes a speed of at least 50 m/s, and preferably of between 80 m/s and 150 m/s. The air is here not "directly" enriched with oxygen as is the case for burners known from prior art, since the air and oxygen are supplied as separate streams or via separate nozzles. Nonetheless, the entire process can still be regarded as "enriched" in an operating state involving oxygen and air.

A burner for diluted combustion according to the invention encompasses a fuel nozzle for supplying fuel to a combustion chamber, at least one air nozzle for supplying air to a combustion chamber, and at least one oxygen nozzle for supplying oxygen to a combustion chamber. The air nozzle and oxygen nozzle are spatially separated from each other.

BRIEF DESCRIPTION OF THE DRAWINGS

The invention will be explained in greater detail below based on the drawings of which.

Figure 3:
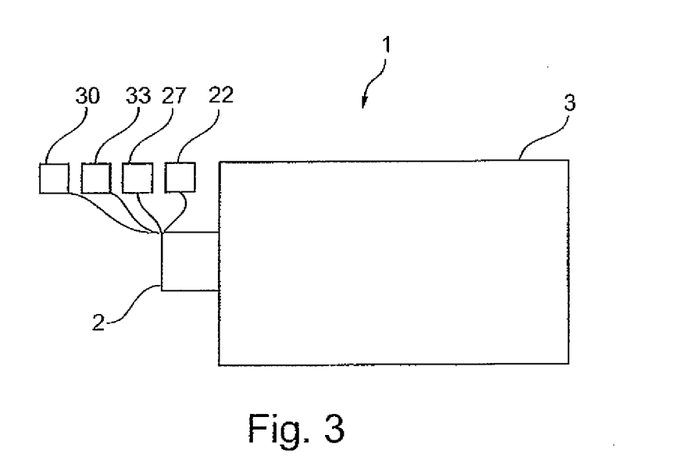
FIG. 3 is a furnace according to the invention with burner and combustion chamber, schematic depiction.

A furnace 1 according to the invention essentially encompasses a burner 2 and combustion chamber 3 (FIG. 3).

The entire furnace 1 will only be schematically described below, so as to explain the principle design of the device according to the invention.

Figure 1:
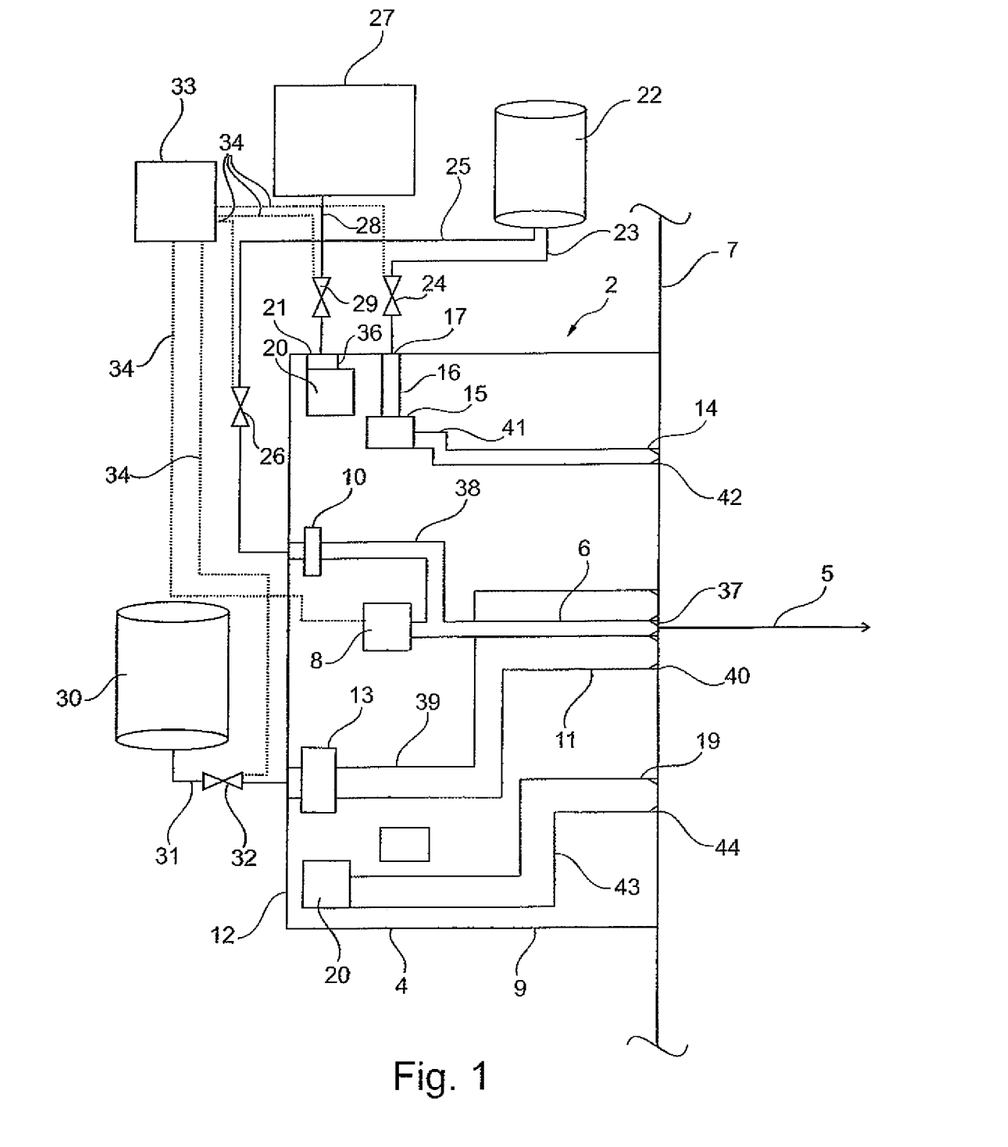
FIG. 1 is the burner according to the invention, schematic side view cut along the A-A line with components.

The burner 2 exhibits a cylindrical burner housing 4 with a front wall, which is designated as the burner side 7, a rear wall 12 and a jacket wall 9 (FIG. 1). A direction perpendicular to the front wall 7 and rear wall 12 and moving from the rear wall 12 to the front wall 9 is referred to as the longitudinal direction 5 of the burner 2.

The burner housing 4 of the burner 2 incorporates a central oxygen nozzle tube 6 that extends roughly concentrically in the longitudinal direction 5 of the burner 2. One end of the oxygen nozzle tube 6 ends on the burner side 7 of the burner. A central oxygen nozzle 37 is situated in this end region.

A UV sensor 8 is arranged at the end of the oxygen nozzle tube 6 lying in the burner housing 4.

The oxygen nozzle tube 6 is connected with an oxygen port 10 by means of an oxygen tube 38. The oxygen port 10 is incorporated on the rear wall 12 of the burner housing 4.

Also provided in the burner housing 4 is a fuel nozzle tube 11 that concentrically envelops the central oxygen nozzle 6. One end of the fuel tube 11 ends on the burner side 7. A fuel nozzle 40 is formed in this end region.

The other end of the fuel nozzle tube 11 is joined with a fuel port 13 by means of a fuel tube 39. The fuel port 13 is formed on the rear wall 12 of the burner housing 4.

The burner housing 4 of the burner 2 incorporates six primary oxygen nozzle tubes 14. The six primary oxygen nozzle tubes 14 are concentrically arranged in a circle around the central oxygen nozzle tube 6, each spaced apart at the same angular distance.

One end of the primary oxygen nozzle tube 14 is joined with an oxygen ring channel 15 by way of a respective primary oxygen tube 41, and the other end terminates in the burner side 7. A primary oxygen nozzle 42 is respectively arranged on the burner-side end of the primary oxygen nozzle tube 14. The oxygen ring channel 15 extends roughly parallel to the burner side 7 in the burner housing 4.

The oxygen ring channel 15 is connected with a primary oxygen port 17 by way of a tube section 16. The primary oxygen port 17 is formed on the jacket wall 9 of the burner housing 4.

Six air nozzle tubes 19 are provided inside the burner housing 4 of the burner 2. The air nozzle tubes 19 are concentrically arranged in a circle around the central oxygen nozzle tube 6 or fuel nozzle tube 11 in the gaps between the primary oxygen nozzle tubes 14, each spaced apart at the same angular distance.

One end of the air nozzle tube 19 is connected with an air ring channel 20 by way of an air tube 43, while the other end terminates in the burner side 7. Respective air nozzles 44 are formed at the burner-side end of the air nozzle tube 19. The air ring channel 20 is designed roughly parallel to the rear wall 12 in one plane. The air ring channel 20 is connected with an air port 21 by way of an air tube section 36. The air port 21 is formed on the jacket wall 9 of the burner housing 4.

Figure 2:
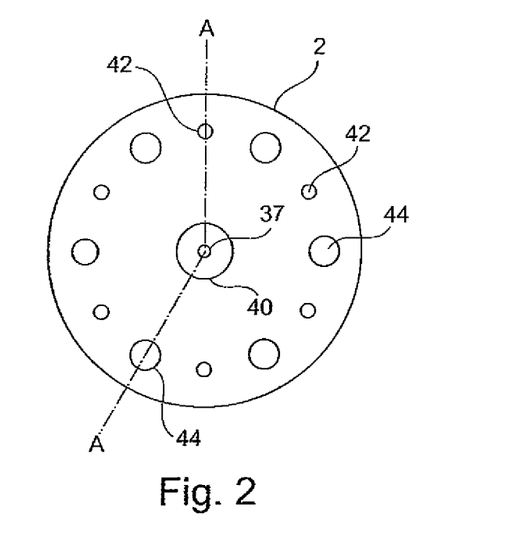
FIG. 2 is the burner according to the invention from FIG. 1, schematic top view from the front.

In a top view of the burner side 7 (FIG. 2), primary oxygen nozzles 42 and air nozzles 44 are arranged in such a way as to be offset by an angle of 30° to each other.

The furnace 1 encompasses an oxygen supply source 22.

The oxygen supply source 22 is connected with the oxygen port 10 by way of an oxygen line 25. An oxygen valve 26 is arranged in the oxygen line 25.

The oxygen supply source 22 is connected with the primary oxygen port 17 by way of a primary oxygen line 23. A primary oxygen valve 24 is arranged in the primary oxygen line 23.

The furnace further exhibits a blower or ventilator 27. The blower 27 is connected with the air port 21 by way of an air line 28. An air valve 29 is arranged in the air line 28.

The furnace 1 exhibits a fuel supply source 30. The fuel supply source 30 is connected with the fuel port 13 by way of a fuel line 31. A fuel valve 32 is arranged in the fuel line 31.

The furnace further exhibits a controller 33. The controller 33 is connected by way of control lines 34 with the UV sensor 8, the fuel valve 32, the air valve 29, the oxygen valve 26 and the primary oxygen valve 24.

The burner side 7 of the burner 2 empties into the combustion chamber 3 (FIG. 3).

The oxygen nozzle 37 and/or the fuel nozzle 40 and/or the air nozzles 44 and/or the primary oxygen nozzles 42 can be designed as nozzles that taper toward the outlet and accelerate a gas stream, or as de Laval nozzles or Venturi tubes.

A recuperator or heat exchanger can be provided in the burner housing 4, so as to preheat the air streams in the corresponding tubes prior to oxidation with the fuel. Such a preheating can take place using the heat of the combustion exhaust gases.

A method for diluted combustion based on the furnace 1 according to the invention will be described below.

An ancillary flame is first provided.

The controller 33 first opens the oxygen valve 26 by way of a control line 34. Oxygen streams out of the oxygen supply source 22 and into the central oxygen nozzle tube 6 via the oxygen line 25, oxygen port 10 and oxygen tube 38. This exposes the central oxygen nozzle 37 to oxygen.

The speed of the central oxygen stream when exiting the burner 2 measures between 15 m/s and 50 m/s, and preferably between 25 m/s and 30 m/s. The oxygen stream exits the central oxygen nozzle 37 in the longitudinal direction 5 of the burner 2. The percentage of central oxygen stream measures between 1% and 5% of the stoichiometric oxygen demand.

The controller 33 holds the central oxygen stream constant during the entire operation.

At the same time, the controller 33 activates the fuel valve 32 by way of a control line 34 and opens it, thereby providing the fuel required to form an ancillary flame. As a result, fuel streams out of the fuel supply source 30 and into the fuel tube 39 via the fuel line 31 and fuel port 13. The fuel nozzle 40 is exposed to fuel by way of the fuel tube 39.

The speed of the fuel stream as it exits the burner 2 measures between 50 m/s and 150 m/s, and preferably between 70 m/s and 90 m/s. The fuel stream exits the fuel nozzle tube 11 in the longitudinal direction 5 of the burner 2.

After ignited by means of an ignition device, the supplied fuel combusts with the oxygen out of the central oxygen nozzle 37. This causes an ancillary flame to form. This ancillary flame generates enough UV radiation to be detectable by the UV sensor 8. The UV sensor 8 notifies the controller 33 about the presence of an ancillary flame by way of a control line 34. The ancillary flame is retained during the entire operation, and can hence also be detected during the entire operation. Starting at a process temperature of 750° C., the UV monitoring can be deactivated. According to European Standard EN 746-2, a high temperature process is involved starting at this temperature. The ancillary flame is then no longer absolutely required, and generates unnecessary nitric oxides. Whether the UV monitor is deactivated depends on the process and type of flame monitor. The process temperature should then be monitored by a temperature sensor, wherein the existing temperature sensor cannot be used for process control. Nonetheless, the combustion chamber 3 can be supplied during the entire operation with a small but constant quantity of fuel by way of the fuel nozzle 40, and with a small constant quantity of oxygen by way of the central oxygen nozzle 37.

For runup purposes, the controller 33 then actuates the primary oxygen valve 24 and fuel valve 32 in parallel by way of a control line 34.

The fuel quantity required for runup is additionally provided to the now further opened fuel valve 32. The speed of the fuel stream as it exits the burner 2 still measures between 50 m/s and 150 m/s, and preferably between 70 m/s and 90 m/s. The fuel stream also still exits the fuel nozzle 40 in the longitudinal direction 5 of the burner 2.

By way of the opened primary oxygen valve 24, the quantity of oxygen stoichiometrically required for the runup of the burner 2 or combustion streams out of the oxygen supply source 22 via the primary oxygen line 23 and into the primary oxygen port 17, and from there into the oxygen ring channel 15. The six primary oxygen nozzle tubes 14, and hence the primary oxygen nozzles 42, are exposed to oxygen via the oxygen ring channel 15 and the primary oxygen tubes 41.

The cross sectionally narrowed regions in the primary oxygen nozzles 42 additionally accelerate the primary oxygen streams. The speed of the primary oxygen streams as they exit the burner 2 measures between 50 m/s and 324 m/s, and preferably between 80 m/s and 200 m/s. The primary oxygen streams exit the primary oxygen nozzles 42 in roughly the longitudinal direction 5. The oxygen exiting the primary oxygen nozzles advantageously exhibits an oxygen content of at least 90-95%, preferably of at least 99%, in order to diminish nitric oxide generation.

The speed of the primary oxygen streams and fuel streams causes a recirculation of the furnace exhaust gases, which in turn are mixed together with the primary oxygen streams and fuel streams.

The nominal operation of the burner will be explained below. The nominal operation can be carried out with air and/or oxygen, depending on the process and procedural step.

Once the combustion chamber 3 has reached its nominal temperature of approx. 800° C. to 900° C., the burner 2 can be switched to nominal operation with air. To this end, the controller 33 actuates the air valve 29 by way of a control line 34, and opens it. As a result, air provided by the blower 27 streams via the air line 28 into the air port 21, and via the air tube section 36 into the air ring channel 20, and hence into the air tubes 43 and into the air nozzle tubes 19. In this way, the air nozzles 44 are exposed to ambient air. As it exits, the air exhibits a pressure of under 1 bar(g), and preferably of under 200 mbar(g) to 300 mbar(g).

The primary oxygen valve 24 is closed parallel to the opening of the air valve 29. Therefore, no more oxygen streams out of the primary oxygen nozzles 42.

The air exits the air nozzles 44 or the burner 2 at a speed of 50 m/s to 330 m/s, and preferably of between 80 m/s and 150 m/s. The cross sectionally narrowed region of the air nozzles 44 accelerates the air streams exiting the air nozzles. These air streams exit in roughly the longitudinal direction 5 of the burner.

As a consequence, the burner 2 can be operated exclusively with the oxygen contained in the air during nominal operations with air.

For example, nominal operation with air can be provided for holding and casting purposes.

If more energy has to be introduced as operation continues, the controller 33 of the primary oxygen valve 26 opens, and meters oxygen to combustion via the primary oxygen nozzles 42 until the desired energy input has been reached. The quantity of air exiting the air nozzles is diminished at the same stoichiometric ratio that oxygen is supplied.

After the combustion chamber 3 has reached its nominal temperature of approx. 800° C. to 900° C., the burner 2 can also continue to be operated during nominal operation with oxygen. A nominal operation with oxygen can be provided for processes that require a higher energy input. For example, this is the case with respect to smelting. The burner 2 is then operated exclusively using oxygen as the oxidant. The device can be more compact in design for nominal operation with oxygen, while at the same time still permitting a high energy input.

Triatomic gases like water and carbon dioxide emit a considerable amount of their thermal energy as thermal radiation. This is why the presence of such triatomic gases leads to heat equalization inside the combustion chamber 3, causing a uniform temperature distribution to arise in the combustion chamber in conjunction with the recirculation, so that roughly the same temperature is present in the entire combustion chamber. As a result, temperature spikes are avoided, and the heat is more uniformly distributed. The efficiency of the entire furnace is enhanced in this way.

The recirculation of furnace exhaust gases yields a low-emission, i.e., reduced-$NO_x$, oxidation.

The method according to the invention can always be tailored or optimized to fit the respective requirements, since the burner can be operated with oxygen, air or in a mixed mode with any air/oxygen ratio desired.

Various arrangements of the primary oxygen nozzles 14 and air nozzles 19 will be described below.

Figure 4:
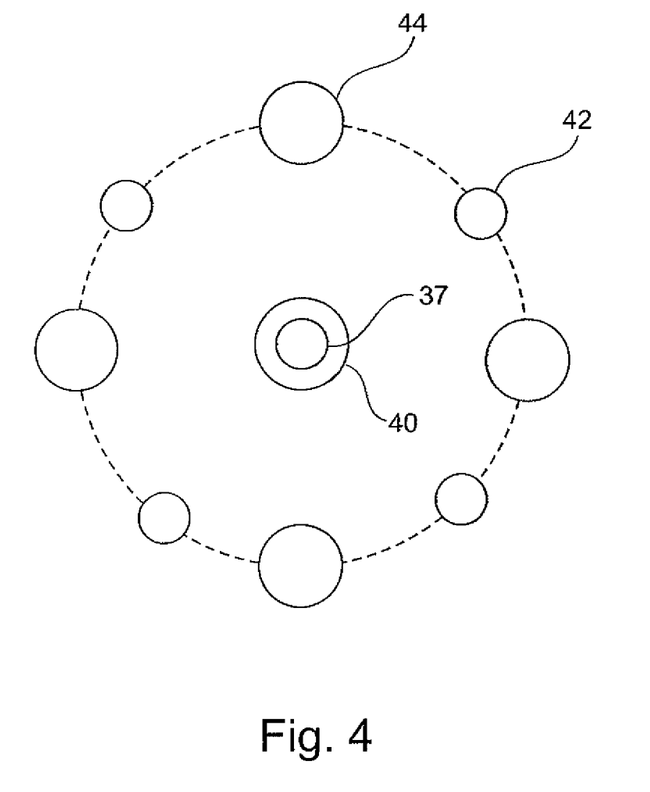
FIG. 4 is a nozzle array, exemplary top view.

For example, four primary oxygen nozzles 42 and four air nozzles 44 can be provided. The latter can be arranged in a circle around the central oxygen nozzle 37 or fuel nozzle 40. The primary oxygen nozzles 42 and air nozzles 44 are then offset relative to each other by an angle of 45° (FIG. 4).

Figure 5:
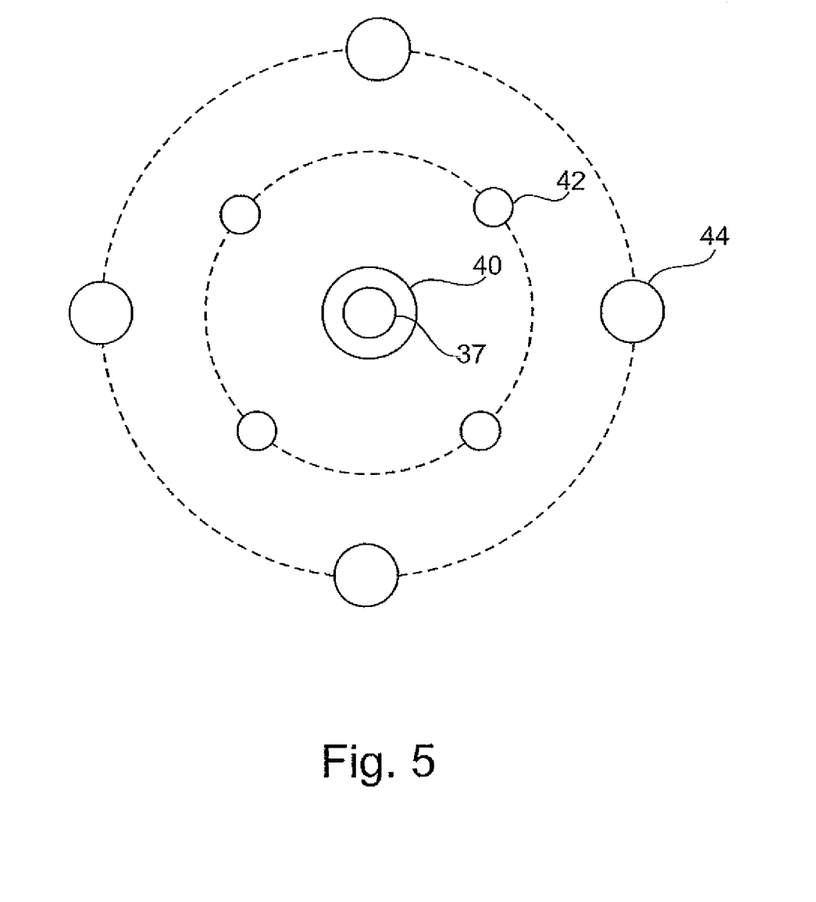
FIG. 5 is another nozzle array, exemplary top view.

The four primary oxygen nozzles 42 can be arranged in a first circle around the central oxygen nozzle 37 or fuel nozzle 40. The four air nozzles 44 are then arranged in a larger circle around the primary oxygen nozzles 42 (FIG. 5). For example, the primary oxygen nozzles 42 and air nozzles 44 are then offset relative to each other by an angle of 22.5°.

Figure 6:
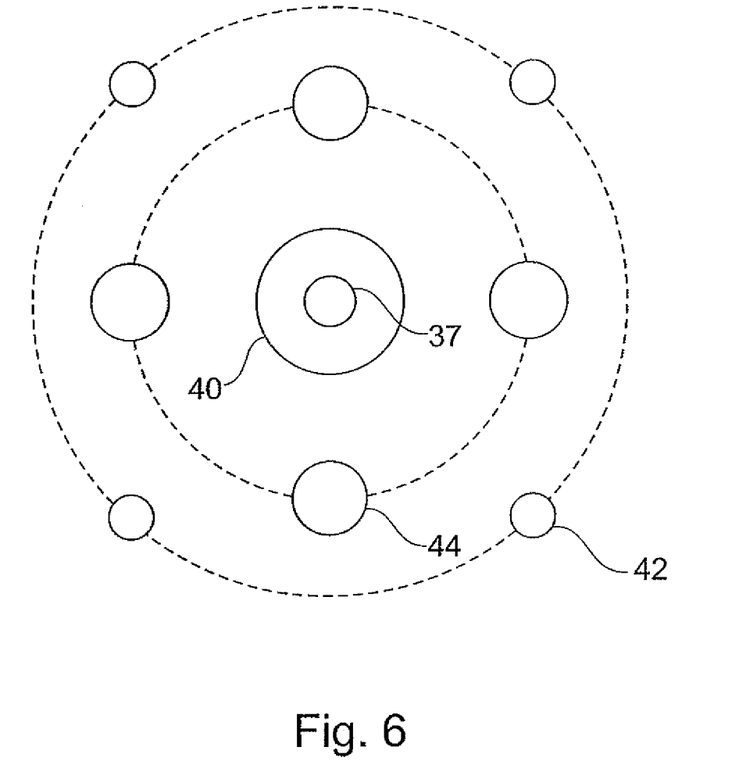
FIG. 6 is another nozzle array, exemplary top view.

In an alternative configuration, the air nozzles 44 and oxygen nozzles 42 can also be arranged in such a way as to place the air nozzles on an inner circle, and the oxygen nozzles 42 on an outer circle (FIG. 6).

Figure 7:
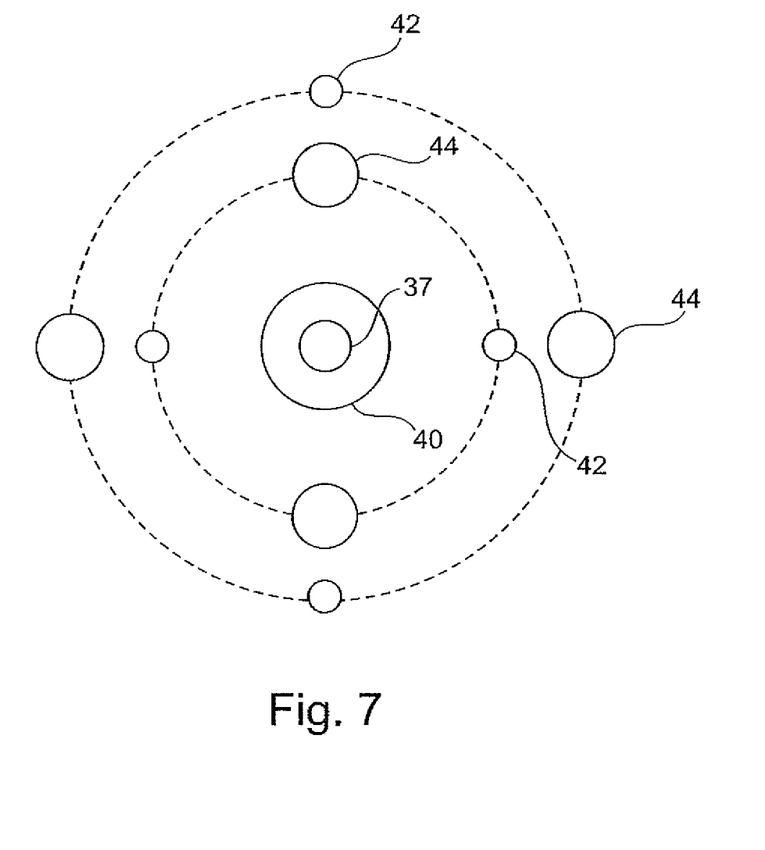
FIG. 7 is another nozzle array, exemplary top view.

It can also be provided that a respective two air nozzles 44 and two oxygen nozzles 42 be arranged on one respective circle (FIG. 7).

Figure 8:
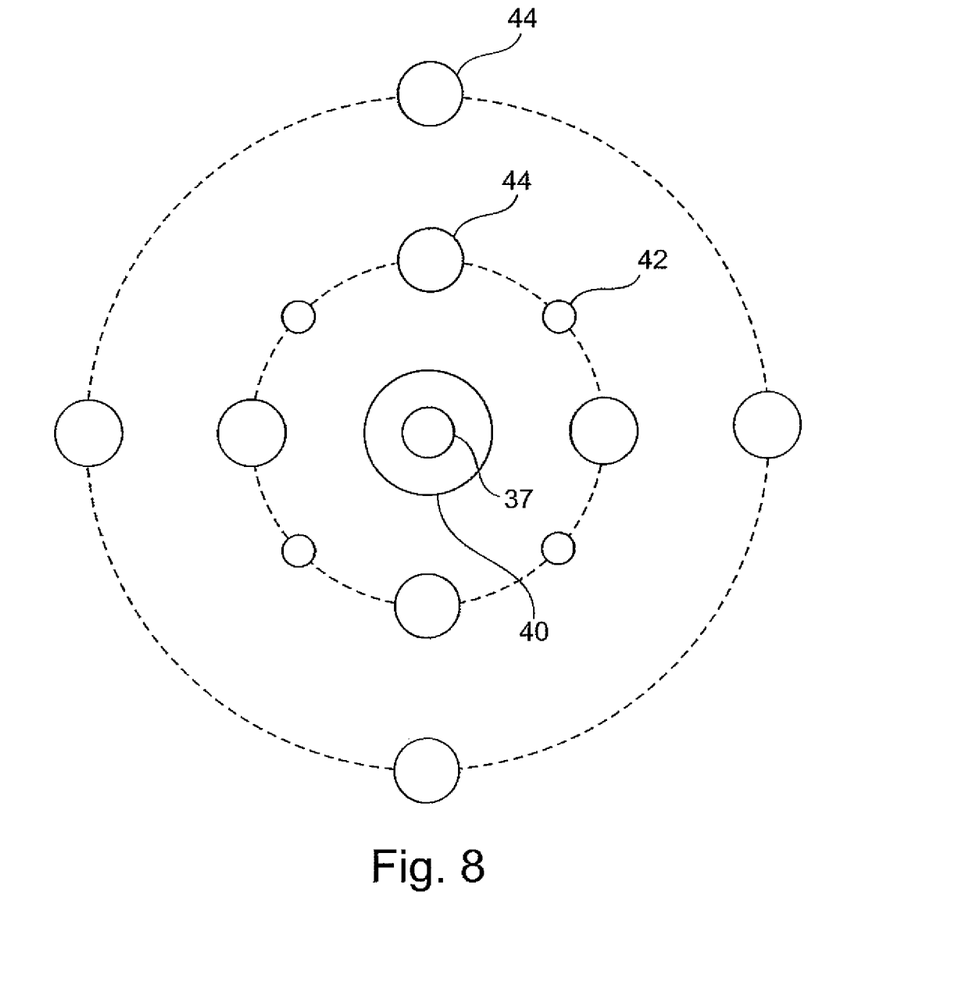
FIG. 8 is another nozzle array, exemplary top view.

Four air nozzles 44 and four oxygen nozzles 42 can also be arranged on the inner circle, while placing only four oxygen nozzles 42 or air nozzles 44 on the outer circle (FIG. 8).

Figure 9:
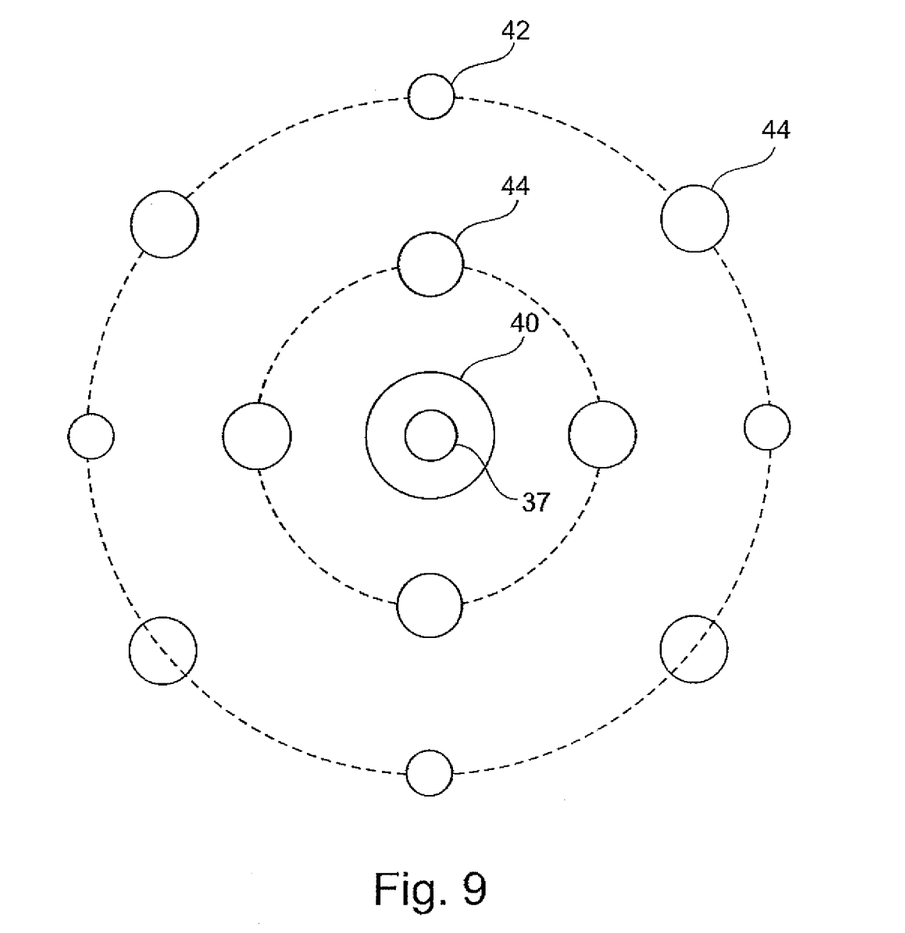
FIG. 9 is another nozzle array, exemplary top view.

For example, four air nozzles 44 can also be arranged on the inner circle, and a respective four air nozzles 44 and four oxygen nozzles 42 on the outer circle (FIG. 9).

A wide variety of angular distances between the nozzles 42,44 is basically possible, as are arrangements on one, two, three or more circles.

What is claimed is:

1. A burner apparatus for diluted combustion, comprising:
a combustion chamber;
a fuel nozzle for supplying fuel to the combustion chamber;
a plurality of air nozzles arranged in a circle around the fuel nozzle for supplying a plurality of air streams to the combustion chamber; and
a plurality of oxygen nozzles arranged in the circle around the fuel nozzle for supplying a plurality of oxygen streams to the combustion chamber, the oxygen nozzle alternating with the air nozzles along the circle and spatially separated and offset from the plurality of air nozzles.

2. A burner for diluted combustion, comprising:
a fuel nozzle for supplying fuel to a combustion chamber;
a plurality of air nozzles arranged in a circle around the fuel nozzle for supplying a plurality of aft streams to the combustion chamber; and
a plurality of oxygen nozzles for supplying a plurality of oxygen streams to the combustion chamber, the plurality of oxygen nozzles spatially separated in the circle from the plurality of air nozzles;
wherein the separate air nozzles and oxygen nozzles alternate along the circle and are offset from each other.

3. The burner according to claim 2, further comprising a controller in communication with at least one air nozzle and at least one oxygen nozzle to switch between operation with air, operation with oxygen, and operation with oxygen and air, during combustion.

4. The burner according to claim 2, further comprising an additional oxygen nozzle arranged centrally in the fuel nozzle.

5. The burner according to claim 2, wherein the plurality of oxygen nozzles comprises from 2 to 12 oxygen nozzles, and the plurality of air nozzles comprises from 2 to 12 air nozzles.

6. The burner according to claim 2, further comprising at least one port for connection with an oxygen source, and at least one port for connection with an air source.

7. A method for diluted combustion, comprising:
supplying a fuel stream, a plurality of air streams and a plurality of oxygen streams from a burner into a combustion chamber;
spatially separating the plurality of air streams and oxygen streams from each other as separate streams arranged in a circle around said fuel stream with each of the separate air streams and oxygen streams alternating along the circle and offset from each other; and
adjusting volumetric streams of the plurality of air and oxygen streams independently of each other for selecting between pure operation with the air streams, pure operation with the oxygen streams, and mixed operation with the oxygen and the air streams during the combustion.

8. The method according to claim 7, wherein the supplying comprises the plurality of air and oxygen streams exiting the burner in a direction substantially parallel to a longitudinal direction of the burner.

9. The method according to claim 7, further comprising operating the burner with oxygen during run up, and optionally with the plurality of air streams, the plurality of oxygen streams, or a mixture of the air and oxygen streams in normal operation as an oxidant for the combustion.

10. The method according to claim 7, further comprising:
supplying a central oxygen stream to the combustion chamber;
centrally locating the central oxygen stream in the fuel stream;
enveloping the central oxygen stream with the fuel stream; and
forming an ancillary flame with the central oxygen stream and a portion of fuel in the fuel stream.

11. The method according to claim 7, further comprising recirculating exhaust gas in the combustion chamber, said recirculating occurring internally or externally of the combustion chamber.

12. The method according to claim 7, further comprising exposing the combustion chamber to additional oxygen streams having a speed of from at least 50 m/s to 200 m/s.

13. The method according to claim 12, further comprising enveloping the fuel stream substantially concentrically with the additional oxygen streams.

14. The method according to claim 7, further comprising exposing the combustion chamber to additional air streams having a speed of at least from 50 m/s to 150 m/s.

15. The method according to claim 14, further comprising enveloping the fuel stream substantially concentrically with the additional air streams.

16. The method according to claim 7, further comprising:
exposing the combustion chamber to additional oxygen streams having a speed of from at least 50 m/s to 200 m/s, and enveloping the fuel stream substantially concentrically with the additional oxygen streams; and
exposing the combustion chamber to additional air streams having a speed of from at least 50 m/s to 150 m/s, and enveloping the fuel stream substantially concentrically with the additional air streams.

17. The method according to one of claim 7, wherein the fuel stream has a speed of from at least 50 m/s to 90 m/s.

* * * * *